US012598559B2

(12) United States Patent
Caporal Del Barrio et al.

(10) Patent No.: US 12,598,559 B2
(45) Date of Patent: Apr. 7, 2026

(54) PREDICTIVE BACK-OFF REPORTING IN TELECOMMUNICATION SYSTEMS

(71) Applicant: Nokia Technologies Oy, Espoo (FI)

(72) Inventors: Samantha Caporal Del Barrio, Aalborg (DK); Nuno Manuel Kiilerich Pratas, Gistrup (DK); Sari Kaarina Nielsen, Espoo (FI); Simon Svendsen, Aalborg (DK); Benny Vejlgaard, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 792 days.

(21) Appl. No.: 17/894,469

(22) Filed: Aug. 24, 2022

(65) Prior Publication Data

US 2022/0408379 A1    Dec. 22, 2022

Related U.S. Application Data

(63) Continuation of application No. PCT/EP2021/053492, filed on Feb. 12, 2021, which
(Continued)

(51) Int. Cl.
*H04L 1/00* (2006.01)
*H04W 24/10* (2009.01)
(Continued)

(52) U.S. Cl.
CPC ......... *H04W 52/367* (2013.01); *H04L 1/0026* (2013.01); *H04W 24/10* (2013.01);
(Continued)

(58) Field of Classification Search
CPC ........... H04W 52/367; H04W 72/0473; H04W 72/0446; H04L 1/0026
(Continued)

(56) References Cited

U.S. PATENT DOCUMENTS

2003/0086486 A1    5/2003  Graziano et al.
2014/0370929 A1*  12/2014  Khawand ............ H04B 1/3838
                                                      455/522
(Continued)

FOREIGN PATENT DOCUMENTS

WO    2017/196612 A1    11/2017
WO    2020/228934 A1    11/2020
WO    2020/259852 A1    12/2020

OTHER PUBLICATIONS

"3rd Generation Partnership Project; Technical Specification Group Radio Access Network; NR; User Equipment (UE) radio transmission and reception; Part 2: Range 2 Standalone (Release 17)", 3GPP TS 38.101-2, V17.5.0, Mar. 2002. pp. 1-197.
(Continued)

*Primary Examiner* — Chuck Huynh
(74) *Attorney, Agent, or Firm* — Carter, DeLuca & Farrell LLP

(57) ABSTRACT

Various communication systems may benefit from selectively monitoring alternative links. In certain example embodiments, an apparatus may comprise at least one processor and at least one memory including computer program code. The at least one memory and the computer program code are configured to, with the at least one processor, cause the apparatus to determine that at least one obstacle has entered at least one predefined region and transmit to at least one network entity at least one indication comprising at least one predicted-power back off (P-PBO) value. The at least one memory and the computer program code are further configured to, with the at least one processor, cause the apparatus to generate at least one predictive-PBO report (P-PBOR) and transmit the at least one P-PBOR to the at least one network entity.

1 Claim, 14 Drawing Sheets

Related U.S. Application Data is a continuation of application No. 16/808,997, filed on Mar. 4, 2020, now abandoned.

(51) Int. Cl.
| | |
|---|---|
| *H04W 52/36* | (2009.01) |
| *H04W 72/044* | (2023.01) |
| *H04W 72/0446* | (2023.01) |
| *H04W 52/28* | (2009.01) |

(52) U.S. Cl.
CPC ... *H04W 72/0446* (2013.01); *H04W 72/0473* (2013.01); *H04W 52/283* (2013.01)

(58) Field of Classification Search
USPC .......................................................... 455/402
See application file for complete search history.

(56) References Cited

U.S. PATENT DOCUMENTS

| | | | | |
|---|---|---|---|---|
| 2016/0098053 A1* | 4/2016 | Khawand | ............ | H04W 52/362 |
| | | | | 307/116 |
| 2018/0167897 A1 | 6/2018 | Sampath et al. | | |
| 2019/0261289 A1 | 8/2019 | Raghavan et al. | | |

OTHER PUBLICATIONS

"3rd Generation Partnership Project; Technical Specification Group Radio Access Network; NR; Medium Access Control (MAC) protocol specification (Release 17)", 3GPP TS 38.321, V17.0.0, Mar. 2022, pp. 1-221.

"3rd Generation Partnership Project; Technical Specification Group Radio Access Network; NR; User Equipment (UE) radio access capabilities (Release 17)", 3GPP TS 38.306, V17.0.0, Mar. 2022, pp. 1-174.

Office Action received for corresponding European Patent Application No. 21706191.0, dated Oct. 1, 2024, 6 pages.

Office Action received for corresponding Chinese Patent Application No. 202180018660.0, dated Feb. 8, 2025, 9 pages of office action and no pages of translation available.

Bao et al., "Self-Organizing Networks for LTE and LTE-A : Technologies and Standardization", ZTE Technology Journal, vol. 119, No. 01, Feb. 2013, 5 pages.

Office action received for corresponding Indian Patent Application No. 202247055919, dated Dec. 7, 2022, 6 pages.

Wu et al., "Safe for Generations to Come", IEEE Microwave Magazine, vol. 16, No. 2, 2015, pp. 65-84.

Wu et al., "The Human Body and Millimiter-Wave Wireless Communication Systems: Interactions and Implications", IEEE International Conference on Communications (ICC), Jun. 8-12, 2015, pp. 2423-2429.

"Electronic Code of Federal Regulations", e-CFR, Retrieved on Aug. 22, 2022, Webpage available at : https://www.ecfr.gov/cgi-bin/text-idx?SID=033401f2cf80f6fa990cbc56b1858813&mc=true&node=se47.1.2_11093&rgn=div8.

"3rd Generation Partnership Project; Technical Specification Group Radio Access Network; NR; Medium Access Control (MAC) protocol specification (Release 15)", 3GPP TS 38.321, V15.8.0, Dec. 2019, pp. 1-78.

"New WID: Further enhancements on MIMO for NR", 3GPP TSG-RAN meeting #86, RP-193133, Agenda: 9.1.1, Samsung, Dec. 9-12, 2019, 5 pages.

"3rd Generation Partnership Project; Technical Specification Group Radio Access Network; NR; Physical layer procedures for control (Release 15)", 3GPP TS 38.213, V15.7.0, Sep. 2019, pp. 1-108.

"3rd Generation Partnership Project; Technical Specification Group Radio Access Network; NR; Radio Resource Control (RRC) protocol specification (Release 15)", 3GPP TS 38.331, V15.7.0, Sep. 2019, pp. 1-527.

"UE FR2 MPE Enhancements and Solutions", 3GPP TSG-RAN WG4 meeting #93, R4-1914274, Agenda: 9.14.1, Nokia, Nov. 18-22, 2019, 7 pages.

"Discussion on the MPE (Maximum Permissible Exposure) Issue", 3GPP TSG-RAN WG1 Ad-Hoc Meeting 1901, R1-1900296, Agenda: 7.2.8.6, OPPO, Jan. 21-25, 2019, 5 pages.

"3rd Generation Partnership Project; Technical Specification Group Radio Access Network; NR; User Equipment (UE) radio transmission and reception; Part 2: Range 2 Standalone (Release 16)", 3GPP TS 38.101-2, V16.2.0, Dec. 2019, pp. 1-157.

Non-Final Office action received for corresponding U.S. Appl. No. 16/808,997, dated Jan. 6, 2021, 14 pages.

International Search Report and Written Opinion received for corresponding Patent Cooperation Treaty Application No. PCT/EP2021/053492, dated May 4, 2021, 13 pages.

"UE FR2 MPE enhancements and solutions", 3GPP RAN WG4 Meeting #94-e, R4-2001382, Agenda: 8.14.1.1, Nokia, Feb. 24-Mar. 6, 2020, 5 pages.

"Pre-emptive solution for MPE issues mitigation", TSG-RAN Working Group 4 (Radio) #93, R4-1913690, Agenda: 9.14.1, Interdigital Inc, Nov. 18-22, 2019, 8 pages.

Final Office action received for corresponding U.S. Appl. No. 16/808,997, dated Jul. 19, 2021, 14 pages.

* cited by examiner gNB (a)

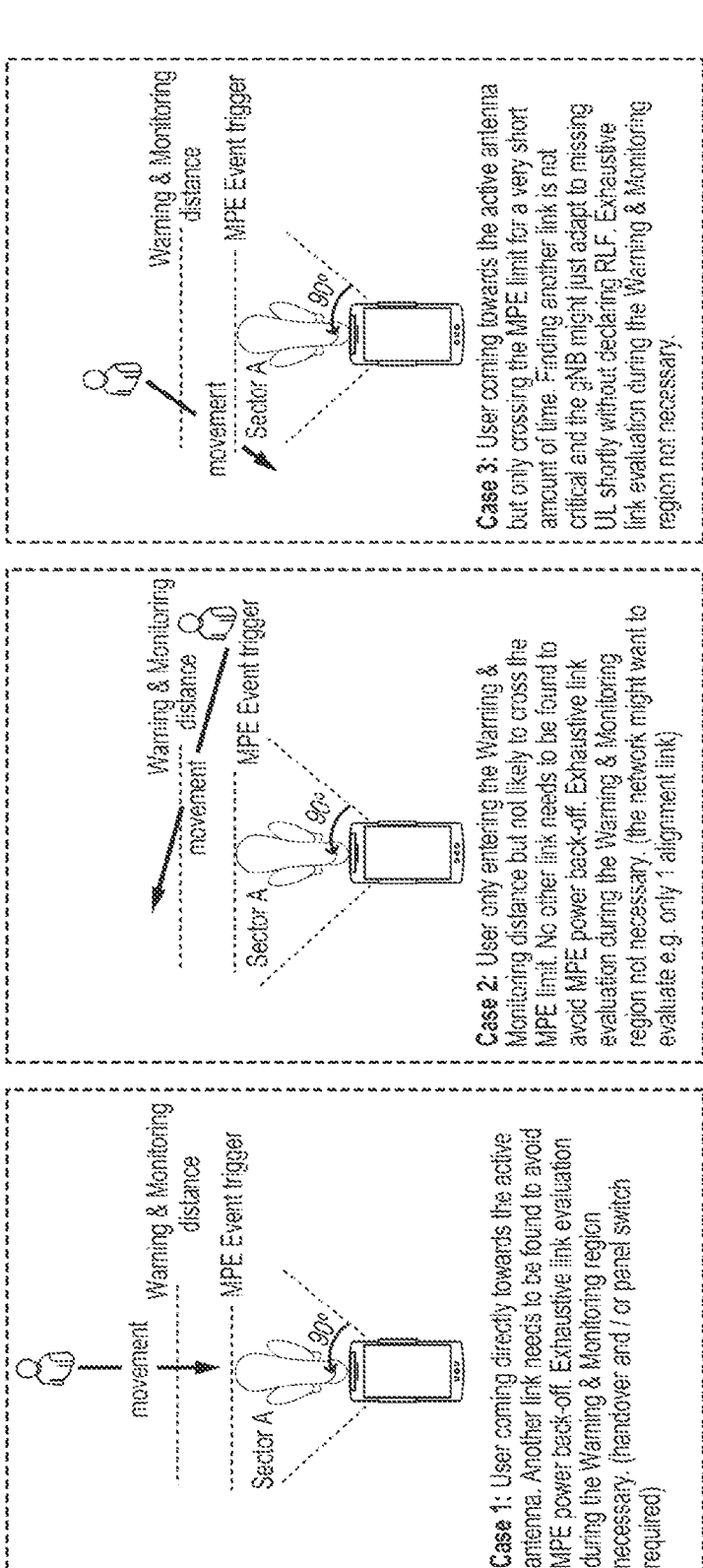

Case 1: User coming directly towards the active antenna. Another link needs to be found to avoid MPE power back-off. Exhaustive link evaluation during the Warning & Monitoring region necessary. (handover and / or panel switch required)

Case 2: User only entering the Warning & Monitoring distance but not likely to cross the MPE limit. No other link needs to be found to avoid MPE power back-off. Exhaustive link evaluation during the Warning & Monitoring region not necessary. (the network might want to evaluate e.g. only 1 alignment link)

Case 3: User coming towards the active antenna but only crossing the MPE limit for a very short amount of time. Finding another link is not critical and the gNB might just adapt to missing UL shortly without declaring RLF. Exhaustive link evaluation during the Warning & Monitoring region not necessary.

Calculated MPE allowed PA Power vs User Distance

Power in dBm

Distance in mm

——— 2x2 Array @ EIRP = 36.1 dB    ———— 3x3 Array @ EIRP = 39.2 dB    ········ 4x4 Array @ EIRP = 41.5 dB ········ 6x6 Array @ EIRP = 44.9 dB    ——·— 8x8 Array @ EIRP = 47.5 dB

FIG. 7

| R | R | maxPBO |
|---|---|---|
| R | R | Pcmax |

| R | R | maxPBO |
|---|---|---|
| R | R | maxULDutyCycle-FR2 |
| R | R | Pcmax |

| R | R | maxPBO |
|---|---|---|
| R | R | maxULDutyCycle-FR2 |
| R | R | PH |
| R | R | Pcmax |

FIG. 8

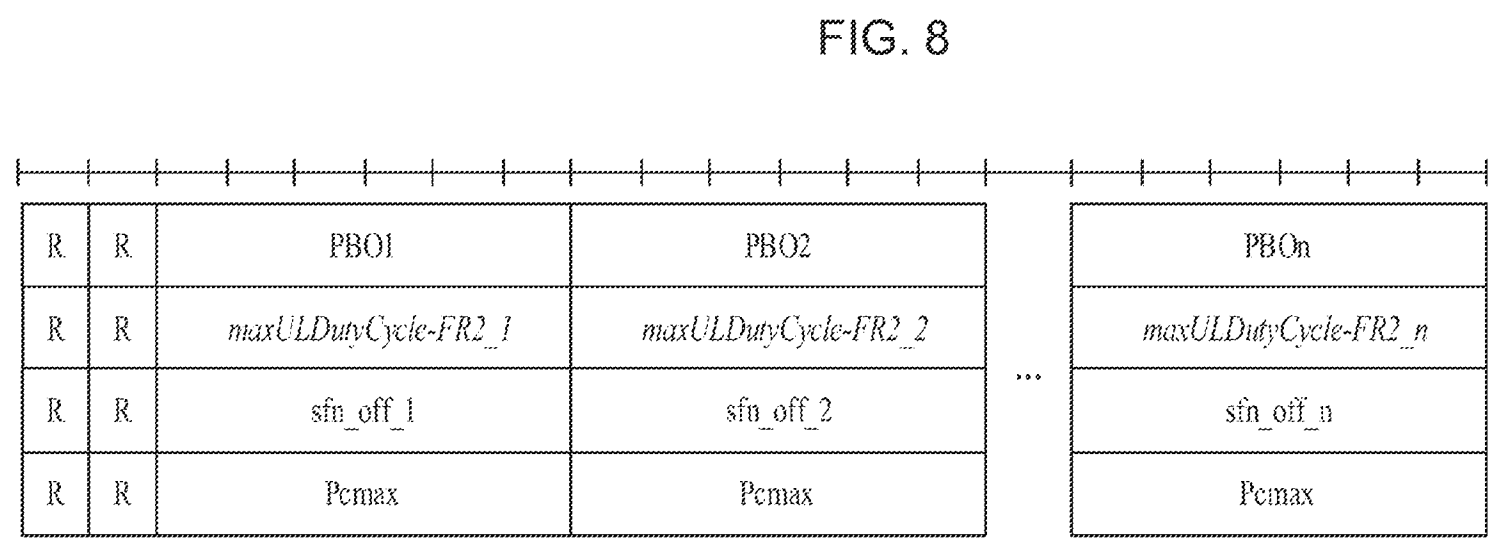

| | | PBO1 | PBO2 | ⋮ | PBOn |
|---|---|---|---|---|---|
| R | R | $maxULDutyCycle\text{-}FR2\_1$ | $maxULDutyCycle\text{-}FR2\_2$ | ⋮ | $maxULDutyCycle\text{-}FR2\_n$ |
| R | R | sfn_off_1 | sfn_off_2 | ⋮ | sfn_off_n |
| R | R | Pcmax | Pcmax | ⋮ | Pcmax |

FIG. 10

UE sends P-BCR (incl. PBO vector)

UE sends Warning message (incl. max PBO)

UE sends updated P-BCR

PBO required

Max PBO

W&M region    MPE event start

Increasing severity of MPE event

Case 1: the Warning message informs the gNB of the maximum PBO for the given array in the given conditions. The P-BCR informs that the max PBO will be hit and how quickly it will happen (e.g. subframe number). P-BCR is periodically updated.

UE sends P-BCR (incl. PBO vector)

UE sends Warning message (incl. max PBO)

UE sends updated P-BCR (MPE event won't be triggered)

PBO required

Max PBO

W&M region

Case 2: the Warning message informs the gNB of the maximum PBO for the given array in the given conditions. The P-BCR informs that the MPE user trajectory won't trigger the MPE event. P-BCR is periodically updated.

UE sends P-BCR (won't hit maxPBO + only short time)

UE sends Warning message (incl. max PBO)

PBO required

Max PBO

W&M region    MPE event start    MPE event stop

Case 3: the Warning message informs the gNB of the maximum PBO for the given array in the given conditions. The P-BCR informs that the user trajectory won't hit the max PBO during the MPE event and that the duration of the MPE event is short (e.g. x subframes). P-BCR is periodically updated.

FIG. 11

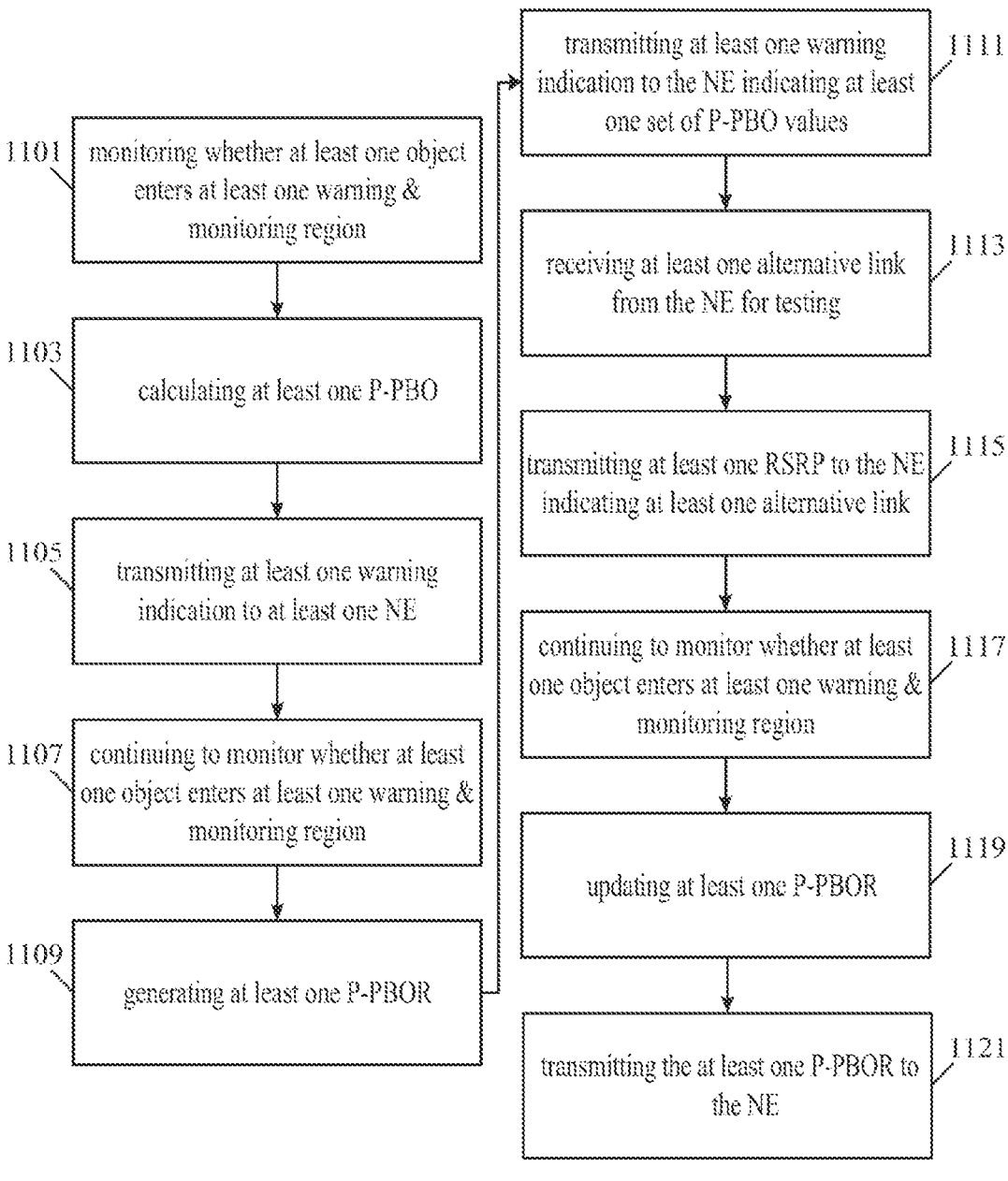

1101 — monitoring whether at least one object enters at least one warning & monitoring region 1103 — calculating at least one P-PBO 1105 — transmitting at least one warning indication to at least one NE 1107 — continuing to monitor whether at least one object enters at least one warning & monitoring region 1109 — generating at least one P-PBOR 1111 — transmitting at least one warning indication to the NE indicating at least one set of P-PBO values 1113 — receiving at least one alternative link from the NE for testing 1115 — transmitting at least one RSRP to the NE indicating at least one alternative link 1117 — continuing to monitor whether at least one object enters at least one warning & monitoring region 1119 — updating at least one P-PBOR 1121 — transmitting the at least one P-PBOR to the NE

FIG. 12

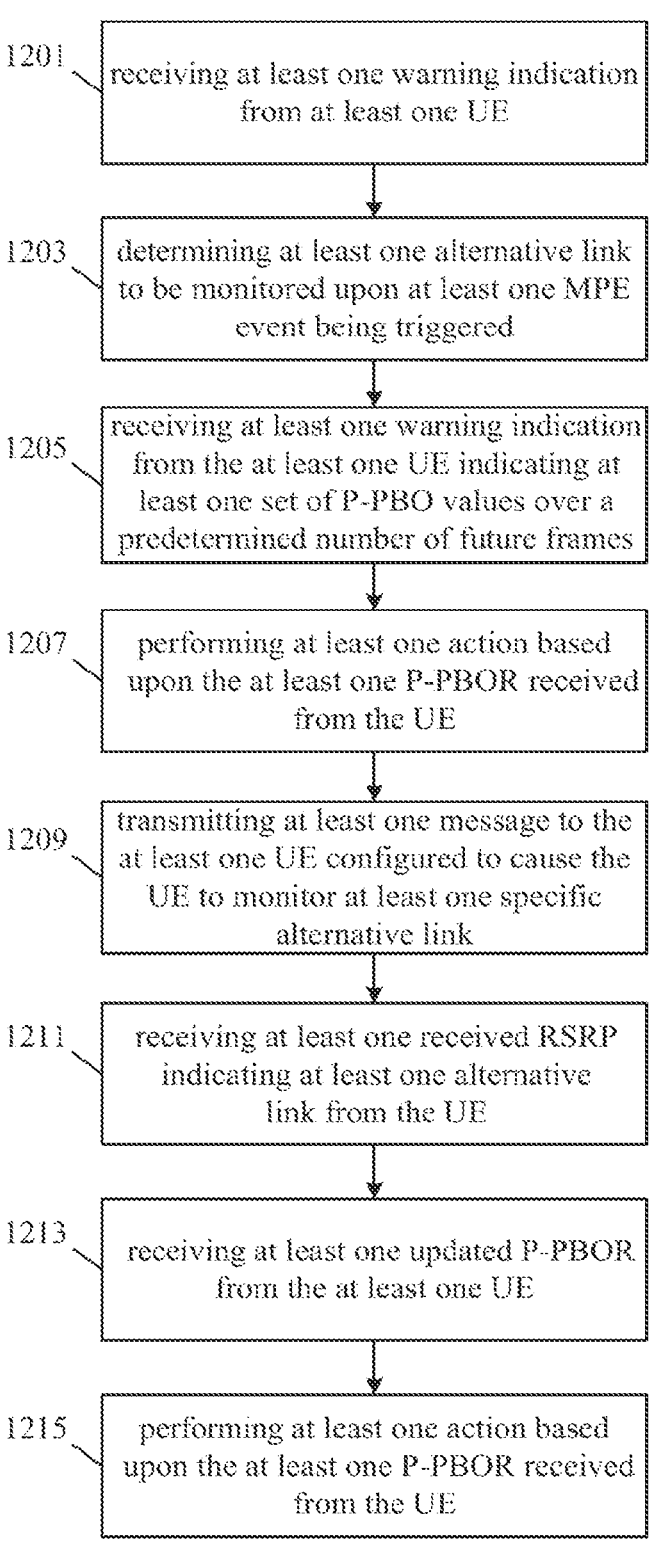

1201 — receiving at least one warning indication from at least one UE

1203 — determining at least one alternative link to be monitored upon at least one MPE event being triggered 1205 — receiving at least one warning indication from the at least one UE indicating at least one set of P-PBO values over a predetermined number of future frames 1207 — performing at least one action based upon the at least one P-PBOR received from the UE 1209 — transmitting at least one message to the at least one UE configured to cause the UE to monitor at least one specific alternative link 1211 — receiving at least one received RSRP indicating at least one alternative link from the UE 1213 — receiving at least one updated P-PBOR from the at least one UE 1215 — performing at least one action based upon the at least one P-PBOR received from the UE

FIG. 13

PREDICTIVE BACK-OFF REPORTING IN TELECOMMUNICATION SYSTEMS

TECHNICAL FIELD

Some example embodiments may generally relate to mobile or wireless telecommunication systems, such as Long Term Evolution (LTE), fifth generation (5G) radio access technology, new radio (NR) access technology, or other communications systems. For example, certain example embodiments may relate to systems and/or methods for selectively monitoring alternative links.

BACKGROUND

Examples of mobile or wireless telecommunication systems may include the Universal Mobile Telecommunications System (UMTS) Terrestrial Radio Access Network (UTRAN), LTE Evolved UTRAN (E-UTRAN), LTE-Advanced (LTE-A), MulteFire, LTE-A Pro, and/or 5G radio access technology or NR access technology. 5G wireless systems refer to the next generation (NG) of radio systems and network architecture. A 5G system is primarily built on a 5G NR, but a 5G (or NG) network may also be built on the E-UTRA radio. It is estimated that NR provides bitrates of at least 10-20 Gbit/s, and can support at least service categories such as enhanced mobile broadband (eMBB), ultra-reliable low-latency-communication (URLLC), and massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR, LTE, and LTE-Advanced radio accesses. It is noted that in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

In accordance with some example embodiments, a method may include determining that at least one obstacle has entered at least one predefined region. The method may further include transmitting to at least one network entity at least one indication comprising at least one predicted-power back off (P-PBO) value. The method may further include generating at least one predictive-PBO report (P-PBOR). The method may further include transmitting the at least one P-PBOR to the at least one network entity.

In accordance with various example embodiments, an apparatus may include means for determining that at least one obstacle has entered at least one predefined region. The apparatus may further include means for transmitting to at least one network entity at least one indication comprising at least one predicted-power back off (P-PBO) value. The apparatus may further include means for generating at least one predictive-PBO report (P-PBOR). The apparatus may further include means for transmitting the at least one P-PBOR to the at least one network entity.

In accordance with certain example embodiments, an apparatus may include at least one processor and at least one memory including computer program code. The at least one memory and the computer program code can be configured to, with the at least one processor, cause the apparatus to at least determine that at least one obstacle has entered at least one predefined region. The at least one memory and the computer program code can be further configured to, with the at least one processor, cause the apparatus to at least transmit to at least one network entity at least one indication comprising at least one predicted-power back off (P-PBO) value. The at least one memory and the computer program code can be further configured to, with the at least one processor, cause the apparatus to at least generate at least one predictive-PBO report (P-PBOR). The at least one memory and the computer program code can be further configured to, with the at least one processor, cause the apparatus to at least transmit the at least one P-PBOR to the at least one network entity.

In accordance with some example embodiments, a non-transitory computer readable medium can be encoded with instructions that may, when executed in hardware, perform a method. The method may include determining that at least one obstacle has entered at least one predefined region. The method may further include transmitting to at least one network entity at least one indication comprising at least one predicted-power back off (P-PBO) value. The method may further include generating at least one predictive-PBO report (P-PBOR). The method may further include transmitting the at least one P-PBOR to the at least one network entity.

In accordance with various example embodiments, a computer program product may perform a method. The method may include determining that at least one obstacle has entered at least one predefined region. The method may further include transmitting to at least one network entity at least one indication comprising at least one predicted-power back off (P-PBO) value. The method may further include generating at least one predictive-PBO report (P-PBOR). The method may further include transmitting the at least one P-PBOR to the at least one network entity.

In accordance with certain example embodiments, an apparatus may include circuitry configured to determine that at least one obstacle has entered at least one predefined region. The circuitry may further be configured to transmit to at least one network entity at least one indication comprising at least one predicted-power back off (P-PBO) value. The circuitry may further be configured to generate at least one predictive-PBO report (P-PBOR). The circuitry may further be configured to transmit the at least one P-PBOR to the at least one network entity.

In accordance with some example embodiments, a method may include receiving from at least one user equipment at least one indication comprising at least one predicted-power back off (P-PBO) value. The method may further include determining at least one alternative link to be monitored upon at least one event being triggered. The method may further include receiving at least one predictive-PBO report (P-PBOR) from the at least one user equipment.

In accordance with various example embodiments, an apparatus may include means for receiving from at least one user equipment at least one indication comprising at least one predicted-power back off (P-PBO) value. The apparatus may further include means for determining at least one alternative link to be monitored upon at least one event being triggered. The apparatus may further include means for receiving at least one predictive-PBO report (P-PBOR) from the at least one user equipment.

In accordance with certain example embodiments, an apparatus may include at least one processor and at least one memory including computer program code. The at least one memory and the computer program code can be configured to, with the at least one processor, cause the apparatus to at least receive from at least one user equipment at least one indication comprising at least one predicted-power back off (P-PBO) value. The at least one memory and the computer program code can be further configured to, with the at least one processor, cause the apparatus to at least determine at least one alternative link to be monitored upon at least one event being triggered. The at least one memory and the computer program code can be further configured to, with the at least one processor, cause the apparatus to at least receive at least one predictive-PBO report (P-PBOR) from the at least one user equipment.

In accordance with some example embodiments, a non-transitory computer readable medium can be encoded with instructions that may, when executed in hardware, perform a method. The method may include receiving from at least one user equipment at least one indication comprising at least one predicted-power back off (P-PBO) value. The method may further include determining at least one alternative link to be monitored upon at least one event being triggered. The method may further include receiving at least one predictive-PBO report (P-PBOR) from the at least one user equipment.

In accordance with various example embodiments, a computer program product may perform a method. The method may include receiving from at least one user equipment at least one indication comprising at least one predicted-power back off (P-PBO) value. The method may further include determining at least one alternative link to be monitored upon at least one event being triggered. The method may further include receiving at least one predictive-PBO report (P-PBOR) from the at least one user equipment.

In accordance with certain example embodiments, an apparatus may include circuitry configured to receive from at least one user equipment at least one indication comprising at least one predicted-power back off (P-PBO) value. The circuitry may further be configured to determine at least one alternative link to be monitored upon at least one event being triggered. The circuitry may further be configured to receive at least one predictive-PBO report (P-PBOR) from the at least one user equipment.

BRIEF DESCRIPTION OF THE DRAWINGS

For proper understanding of example embodiments, reference should be made to the accompanying drawings, wherein:

FIG. 3 illustrates various scenarios of warning triggers.

FIG. 7 illustrates an example of a warning message according to some example embodiments.

FIG. 8 illustrates an example of a predictive—power back-off report according to certain example embodiments.

FIG. 10 illustrates several scenarios of predictive-backoff report transmissions in response to warning triggers according to various example embodiments.

FIG. 11 illustrates an example of a flow diagram of a method performed by a user equipment according to certain example embodiments.

FIG. 12 illustrates an example of a flow diagram of a method performed by a network entity according to certain example embodiments.

FIG. 13 illustrates an example of various network devices according to certain example embodiments.

DETAILED DESCRIPTION

As the number of online services increases each year, the need for sufficient network bandwidth continues to surge as well. The millimeter-wave (mmW) spectrum, including frequency range 2 (FR2) from 24-52 GHz and beyond, can provide large portions of contiguous bandwidth to fulfil the needs of such high-throughput applications. In order to compensate for the increase of path loss at mmW, 3rd Generation Partnership Project (3GPP) fifth generation (5G) wireless technology specifications supports user equipment (UE) implemented with antenna arrays to provide an additional antenna gain in the order of 9 to 15 dB and at least often more than 20 dB for base stations (BS). However, operating at high frequencies and with such high antenna gains raises health concerns of its users.

In response, government organizations, such as the United States Federal Communications Commission (FCC) and the International Commission on Non-Ionizing Radiation Protection (ICNIRP), have implemented regulations to limit the amount of high frequency signals users are exposed to, for example, maximum permissible exposure (MPE) for regulating power density (PD). In this way, the FCC and ICNIRP have limited MPE at 10 W/m$^2$ (1 mW/cm$^2$) between 6-100 GHz and 10-100 GHz, respectively. Since frequencies below 100 GHz are non-ionizing, the only potential damage at 10 W/m$^2$ is thermal heating.

Figure 1:
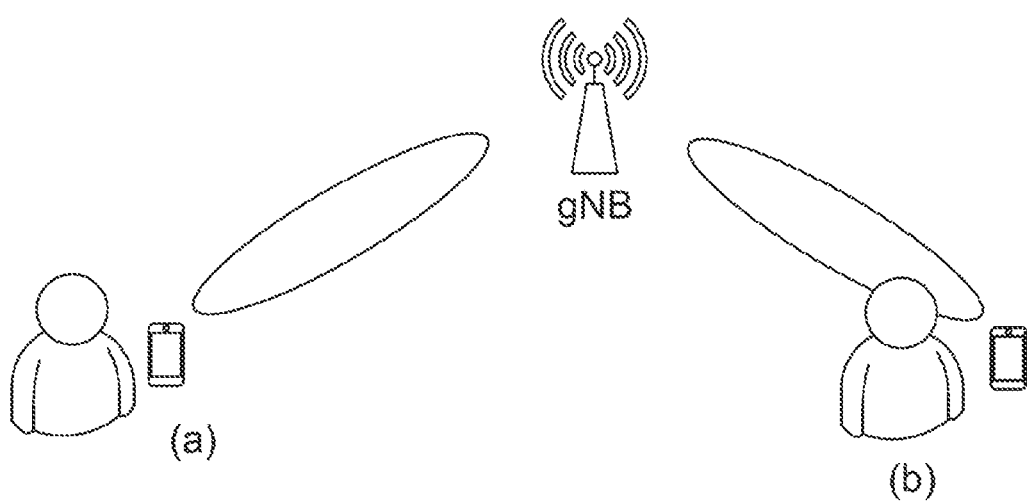
FIG. 1 illustrates an example of various uplink scenarios.

To illustrate this concept, FIG. 1 presents two examples of UE uplink (UL) transmissions. In example (a), the UE has an unobstructed line of sight (LOS) to a next generation Node B (gNB), where the effective isotropically radiated power (EIRP) is maximized. In contrast, example (b) shows a user positioned between the UE and gNB. As noted above, the UE must reduce its output power as the user approaches in order to satisfy MPE regulations.

Since the power density absorbed by a user is inversely proportional to the distance of the user from the source of the non-ionizing radiation, the UE would need to back-off power and/or reduce its array gain as the user approaches in order to comply with MPE regulations. In 5G NR, such power back-off would be substantial, and likely cause radio link failure (RLF). Compared with previous generations (e.g. 4G on FR1), reducing the output power in an FR2 link may cause RLF because of the significant amount of power back-off required and the inherent directivity of the radio link on FR2 5G NR.

Figure 2:
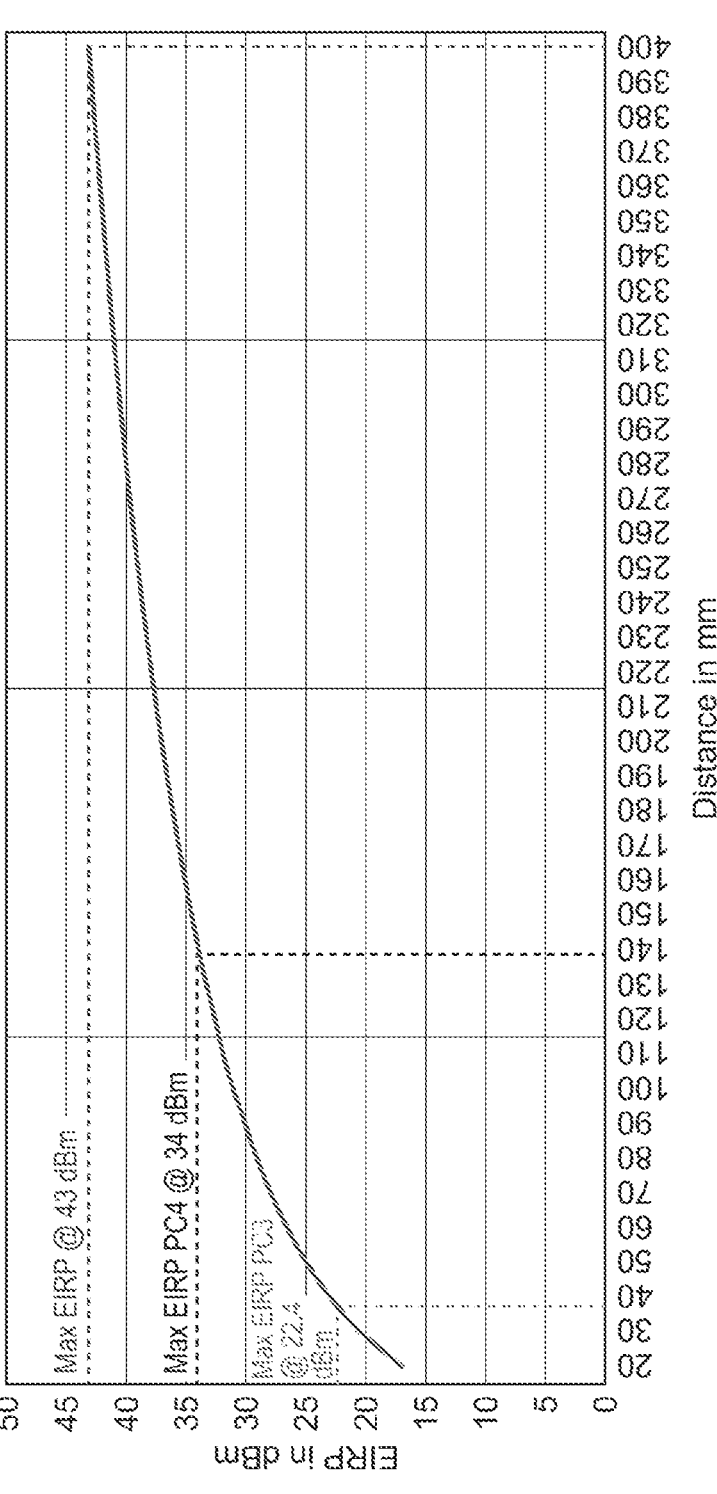
FIG. 2 illustrates the maximum allowed equivalent isotropically radiated power based upon the distance of the antenna to comply with maximum permissible exposure restrictions.

FIG. 2 presents a graphical representation of the EIRP that a UE may safely operate at based on the distance of a user from the UE, which is based on a combination of PA power and array gain. For example, a power class 3 (PC3) UE would need to significantly reduce its emitted power below 34 decibel-milliwatts (dBm or $dB_{mw}$) as a user moves within 140 mm to comply with MPE regulations. Furthermore, the allowed peak EIRP drops to only 8 dBm at 2 mm on a 100% duty cycle. Thus, a UE with a 2×2 array would reduce its transmitted power by at least 26 dB when a user nearly touches the antenna, while an array larger than 2×2 and with higher array gain would require an even larger reduction. Such a reduction of emitted power would particularly affect the UL transmission of the UE. Although there is trade-off between transmission power and duty cycle, if the user is sufficiently close to the UE, the UE must simultaneously reduce its transmission power as well as restrict its duty cycle. However, the lowest duty cycle of 15% would only reduce back off power by 8 dB.

5G NR operates at relatively high frequencies, coupled with high gain antennas, to maintain high-quality signal strength. However, as explained above, high gain antennas may expose users to a significant level of energy, which government entities restrict with MPE thresholds. With the government regulations on mmW exposure, 5G technology on FR2 and beyond may experience challenges from UEs dramatically and unpredictably reducing output power, i.e., the increased risk of RLF when communicating with base stations.

In order for a communication network to minimize RLF under MPE restrictions, the UE would evaluate user positions, and determine power back off. This data would allow the network to apply various mitigation strategies, such as UE handover to another network entity, switching to an unobstructed antenna panel, and/or redirecting UL signals to LTE or FR1 frequencies. These techniques may be initiated when the communications network is informed of an MPE event.

Link redirection may be improved with an MPE warning & monitoring region for early user proximity detection since the network has time to determine which available alternative link would be best. For example, in order to minimize RLF when MPE power limitations are in effect, such a MPE warning and monitoring system may allow a UE to monitor a defined area once an object has been detected as coming into close proximity with the UE. The UE may notify a network entity, such as an eNB, that the UE has begun to monitor this area, and may allow the NE to control the mode of monitoring that is performed by the UE. The UE may also determine that the object has entered close proximity after the object is within a predetermined distance from the UE, and may even use multiple distances to trigger various actions to take once those distances are breached. However, even with a user being within an MPE warning & monitoring region, a user could potentially also remain outside an MPE event trigger distance, only be within the MPE event trigger distance for a short time period, and/or remain at the MPE trigger distance without approaching the antenna. In any of the scenarios above, it may be unnecessary to evaluate whether to initiate some of the above-noted mitigation strategies.

As will be described in further detail below, if a network initiates link redirection, for example handover, after an MPE event notification, the network may not have sufficient time to identify the best alternative link, and would instead need to make an uninformed determination on the best directed link. In this way, the network would be blind since the UE may not continue transmitting UL after the MPE event. However, if the network receives an MPE notification within the MPE warning region, the network can perform an exhaustive evaluation with the UE of all possible alternative links, permitting selection of the best alternative link Some techniques described herein optimize this link evaluation by reducing its time and resource requirements. If the network receives a predictive—power back-off report (P-PBOR) after an MPE warning region is triggered, the network may determine which alternative links to evaluate with the UE during the MPE warning region.

This challenge can be further complicated by MPE trigger distances varying based on the array type, such as 14 cm for a 2×2 array but further for larger arrays, as well as MPE event conditions varying based on the UE panel configuration and operating conditions. None of these complications were present in fourth generation (4G) and earlier technologies, where UL restrictions were triggered only a few millimeters from an antenna and the required P-PBO was typically lower.

The three scenarios illustrated in FIG. 3 display a warning & monitoring mode being triggered, but with different monitoring actions. In Case 1, the gNB requires an alternative link on another panel to avoid RLF, while Case 2 shows a user triggering monitoring without triggering a power back-off. Similarly, Case 3 demonstrates a user triggering power back-off for a period of time so short that the gNB may only adjust to the missing UL packets without needing to declare an RLF, instead of initiating a handover procedure. Each of these Cases show the trade-offs between resources allocated to monitoring, and consequences of UL power back-off. Thus, it would be beneficial to enable the gNB to assess the severity of an MPE event, and then respond with an optimal action by selectively monitoring alternative links.

Figure 4:
FIG. 4 illustrates the maximum allowed PA power during maximum permissible exposure restrictions.

FIG. 4 shows that the P-PBO required to comply with MPE varies at a given distance based upon the array size or configuration, such as EIRP. Similarly, the distance requiring the P-PBO depends on the array size or configuration. In addition, the maximum P-PBO may also be affected depending on e.g., whether the UE operates at maximum PA power and channel conditions. Thus, it would also be beneficial that the maximum P-PBO be evaluated according to UE conditions, and then communicated to the network.

Certain example embodiments described herein may have various benefits and/or advantages to overcome the disadvantages described above. For instance, some example embodiments may not only indicate that an MPE event is likely, but also the severity of it; i.e., MPE warning signal without further indications like P-PBO may not provide the network an indication of the severity of the MPE event. Various example embodiments discussed below may inform the network of P-PBO levels to be applied by reporting time and severity conditions, allowing the network to prioritize solutions to mitigate UL degradation and RLF. Furthermore, the P-PBOR enables the gNB to coordinate efficient problem solving. In addition, the P-PBOR indicates how much time until an MPE event occurs, and how to mitigate such an event. Thus, certain example embodiments are directed to improvements in computer-related technology.

Figure 5:
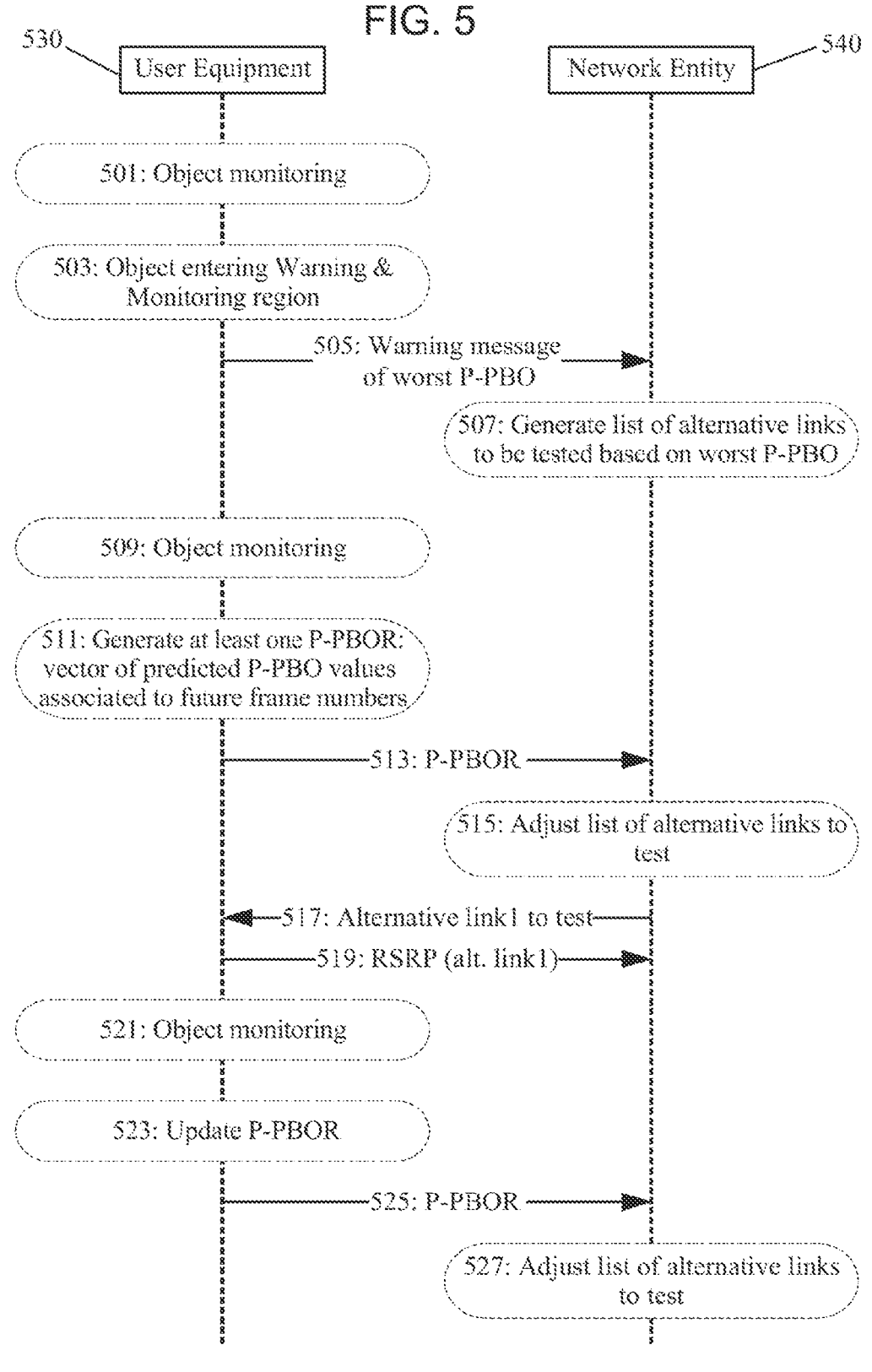
FIG. 5 illustrates a signaling diagram according to certain example embodiments.
Figure 13:
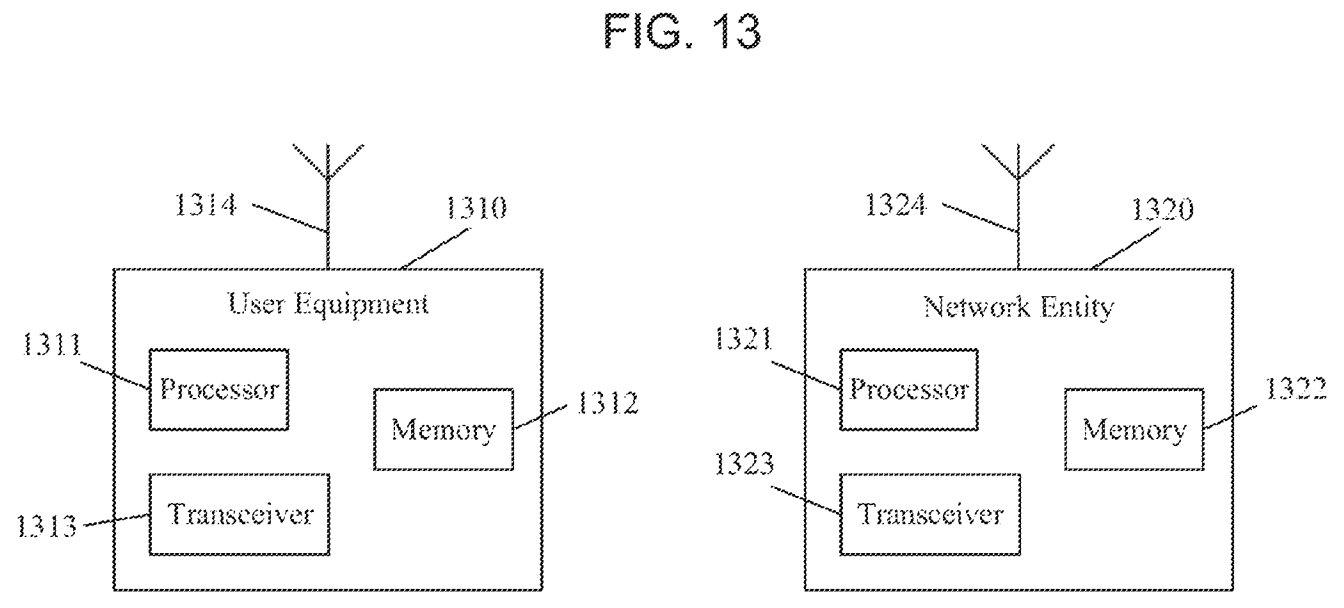

FIG. 5 illustrates an example of a signalling diagram showing communications between UE 530 and NE 540. UE 530 and NE 540 may be similar to UE 1310 and NE 1320, respectively, as illustrated in FIG. 13. At 501, UE 530 may monitor whether at least one object, such as a user or other obstacle, enters at least one warning & monitoring region.

At 503, in response to UE 530 detecting that at least one object enters the at least one warning & monitoring region at 501, UE 530 may calculate at least one predicted power back-off (P-PBO) value. In certain example embodiments, the at least one P-PBO may be associated with a worst-case scenario based on at least one current operating condition of UE 530. For example, the at least one worst-case P-PBO may be a maximum P-PBO.

At 505, UE 530 may transmit at least one warning indication to NE 540 indicating that the at least one warning & monitoring region has been entered, the likelihood of at least one MPE event occurring, the calculated at least one P-PBO value, and/or the worst-case P-PBO calculated at 503.

Figure 6:
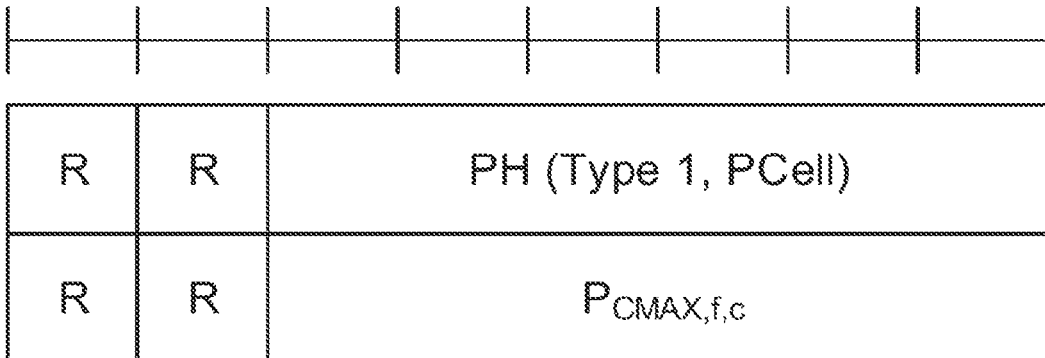
FIG. 6 illustrates an example of a power headroom report.

In some example embodiments, the at least one warning indication may depend on at least one reporting configuration and/or may be similar to a medium access control (MAC) control element (CE) element, such as a power headroom report (PHR) structure described in 3GPP technical specification (TS) 38.321, section 6.1.3.8, as shown in FIG. 6. In general, a PHR reports any changes in path loss, including UL and DL. However, a PHR itself may not be practical for P-PBO reporting since UE power headroom is 100% regardless of transmission power requested by a NE, while transmission exposure may change drastically as the UE moves.

Furthermore, at least one bit of the MAC CE element may be reserved for indicating that the at least one warning indication includes at least one maxP-PBO. In various example embodiments, the at least one warning indication may include one or more of at least one cell radio network temporary identifier (C-RNTI), at least one value, such as the current maximum output power of UE 530 for carrier f of serving cell c ($P_{CMAX, f, c}$), configured as a reference, and/or at least one UL duty cycle (if applied). The at least one warning indication may include any combination of these features, where FIG. 7 illustrates several various combinations.

At 507, NE 540 may determine at least one alternative link to be monitored upon at least one MPE event being triggered. In various example embodiments, the determination may be based on the at least one warning indication indicating that at least one warning region has been triggered and/or indication of a worst P-PBO received from UE 530. As an example, NE 540 may further evaluate at least one neighboring cell load if it is determined that a handover procedure may be needed.

At 509, UE 530 may continue to monitor whether at least one object, such as a user or other obstacle, enters at least one warning & monitoring region, similar to 501. However, 509 may be performed concurrently with 503-507.

At 511, UE 530 may generate at least one P-PBOR. In certain example embodiments, UE 530 may calculate the trajectory of the user/object entering the warning region relative to UE 530, for example, by using at least one array of UE 530 as radar, and/or at least one specific beam. Furthermore, UE 530 may associate at least one future frame number associated with at least one predicted object location, which may be based upon its distance to an active array.

While a PHR reports the power headroom associated with the current frame and link quality in UL and DL, the P-PBOR discussed herein may separate and report the UL degradation due to the predicted user movement for the upcoming frames. This may enable optimal link recovery from NE 540.

Additionally or alternatively, UE 530 may estimate a required P-PBO at a point of time associated with the at least one future frame number, as well as perform a duty cycle calculation. Finally, UE 530 may generate at least one vector, such as a P-PBOR vector, including the predicted P-PBO values associated with the at least one future frame numbers.

At 513, UE 530 may transmit at least one warning indication to NE 540 indicating at least one P-PBO curve over a predetermined number of future frames. For example, UE 530 may transmit the at least one P-PBOR to NE 540, which may be transmitted in at least one MAC container. The at least one P-PBOR may be configured similar to the vectors illustrated in FIG. 8. In some various example embodiments, the at least one P-PBOR may include one or more of at least one vector of P-PBO values, at least one vector of DC values, at least one vector of subframe offset, such as sfn_off_n in FIG. 8, and at least one $P_{Cmax}$ for reference.

Figure 9:
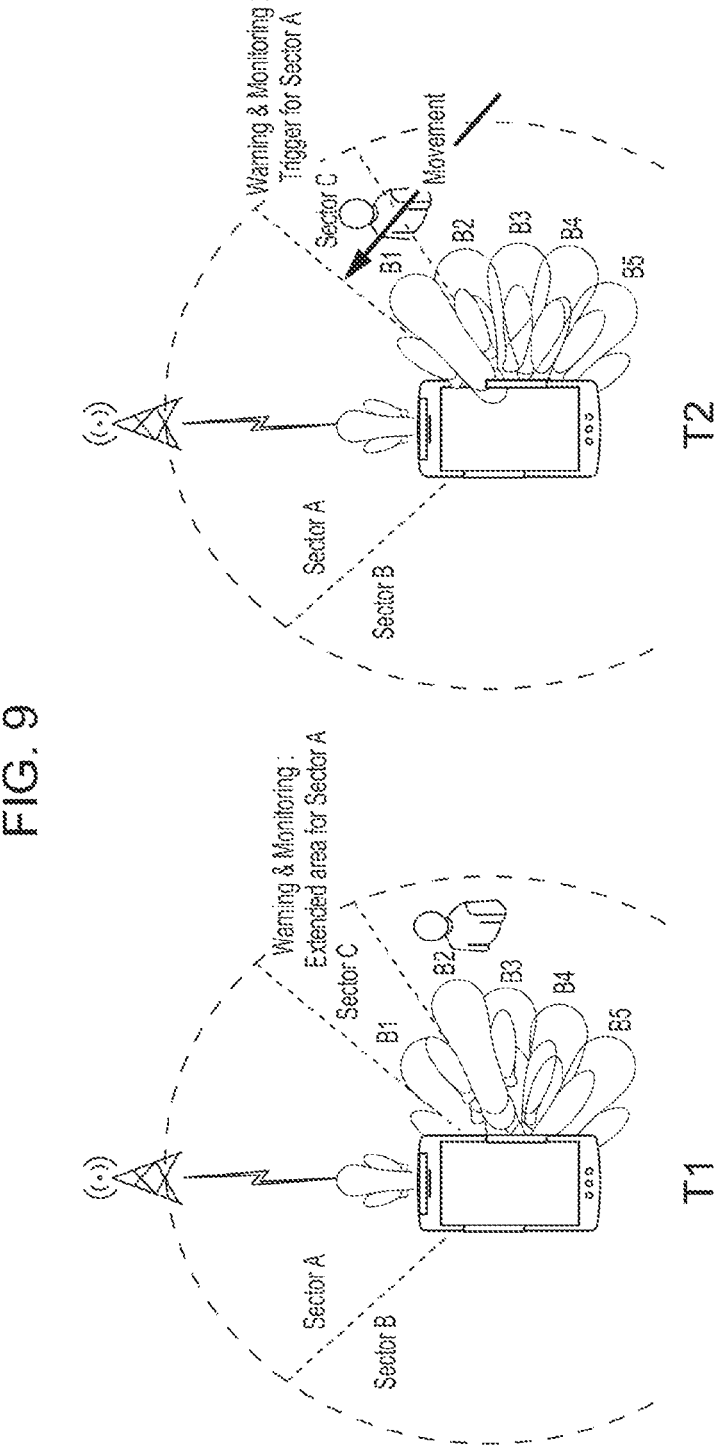
FIG. 9 illustrates some examples of trajectory estimations according to some example embodiments.

In various example embodiments, UE 530 may compute values contained in the at least one P-PBOR by estimating the trajectory of the user/object. Using the example in FIG. 9, UE 530 may determine the position of the user (with a beam from an array not used to communication) with respect to the active array based on the beam providing the detection. Such positioning may also be performed using delay calculations. The at least one P-PBOR may be generated based at least partially upon data from active and/or inactive arrays. At least one active array may be connected to at least one network entity, such as a gNB similar to NE 540, while at least one inactive array may not be connected in a similar way but may instead monitor the at least one user/object and/or provide user/object trajectory data configured for generation of the at least one P-PBOR.

FIG. 10 describes several scenarios associated with the at least one P-PBOR. As summarized above, UE 530 transmits the at least one P-PBOR before the at least one MPE event occurs. The at least one warning indication notifies NE 540 of the worst-case scenario with the P-PBOR vector, which indicates the actual predicted severity of the MPE event over time, in the form of subframes. As shown in Case 1, the user may approach the antenna triggering first the pre-warning region detection and then later the MPE trigger event. The user may enter the pre-warning region without triggering the MPE event, allowing the network to use the received P-PBOR to determine that monitoring a list of alternative links is unnecessary, thereby conserving resources and improving throughput, as presented in Case 2. And in Case 3, the MPE event may be predicted as being short and of medium severity, leaving the network to determine whether to balance the link rather than performing a handover procedure. This would leave UE 530 periodically monitoring the status of the user/obstacle, and transmitting an updated P-PBOR, as discussed above. In each of these three scenarios, NE 540 is notified in advance of the severity of the MPE event, as well as a timeframe, allowing NE 540 to avoid the failure and optimize associated resources in response.

In some example embodiments, the at least one P-PBOR vector of at least one P-PBO may include at least one indication of an actual severity of the at least one MPE event, as well as a period of time that NE 540 may adjust and/or redirect at least one alternative link.

At 515, NE 540 may perform at least one action based upon the at least one P-PBOR received from UE 530 at 513. In some example embodiments, NE 540 may adapt its strategy to compensate for any imbalance between UL and DL. For example, if the severity of the MPE event indicated by UE 530 is below a predetermined threshold, NE 540 may determine a handover procedure should not be performed. Alternatively, if the severity of the MPE event indicated by UE 530 is equal to or above the predetermined threshold, NE 540 may determine to switch at least one UL transmission to a different frequency, such as FR1.

At 517, based upon the at least one action in 515, NE 540 may transmit at least one message to UE 530 configured to cause UE 530 to monitor at least one specific alternative link. At 519, UE 530 may transmit to NE 540 at least one received reference signal receive power (RSRP) indicating at least one alternative link.

At 521, UE 530 may continue to monitor whether at least one object, such as a user or other obstacle, enters at least one warning & monitoring region, similar to 501 and 509. However, 521 may be performed concurrently with 501-519. Furthermore, at 523, UE 530 may update the at least one P-PBOR, which may be transmitted to NE 540 at 525.

Similar to 515, at 527, NE 540 may perform at least one action based upon the at least one P-PBOR received from UE 530 at 525. In some example embodiments, NE 540 may adapt its strategy to compensate for any imbalance between UL and DL. For example, if the severity of the MPE event indicated by UE 530 is below a predetermined threshold, NE 540 may determine that no handover procedure should be performed. Alternatively, if the severity of the MPE event indicated by UE 530 is equal to or above the predetermined threshold, NE 540 may determine to switch at least one UL transmission to a different frequency, such as FR1. In some embodiments, the predetermined threshold may be configured by UE 530 or NE 540, and/or may be associated with at least one future subframe number. Furthermore, the length of the P-PBOR may be configured by NE 540.

FIG. 11 illustrates an example of a flow diagram of a method that may be performed by a UE, such as UE 1310 illustrated in FIG. 13, according to certain example embodiments. At 1101, the UE may monitor whether at least one object, such as a user or other obstacle, enters at least one warning & monitoring region.

At 1103, in response to at least one object is detected as entering the at least one warning & monitoring region at 1101, at least one P-PBO may be calculated. In certain example embodiments, the at least one P-PBO may be associated with a worst-case scenario based on at least one current operating condition of the UE. For example, the at least one worst-case P-PBO may be a maximum P-PBO.

At 1105, at least one warning indication may be transmitted to at least one NE, such as NE 1320 in FIG. 13, indicating that the at least one warning & monitoring region has been entered, the likelihood of at least one MPE event occurring, and/or the worst-case P-PBO calculated at 1103.

In some example embodiments, the at least one warning indication may depend on at least one reporting configuration and/or may be similar to a MAC CE element, such as a PHR structure described in 3GPP TS 38.321, section 6.1.3.8, as shown in FIG. 6. In general, a PHR reports any changes in path loss, including UL and DL. However, a PHR itself may not be practical for P-PBO reporting since UE power headroom is 100% regardless of transmission power requested by a NE, while transmission exposure may change drastically as the UE moves.

Furthermore, at least one bit of the MAC CE element may be reserved for indicating that the at least one warning indication includes at least one maxP-PBO. In various example embodiments, the at least one warning indication may include one or more of at least one C-RNTI, at least one value, such as the current maximum output power of UE 530 for carrier f of serving cell c ($P_{CMAX, f, c}$), configured as a reference, and/or at least one UL duty cycle (if applied). The at least one warning indication may include any combination of these features, where FIG. 7 illustrates several various combinations.

At 1107, the UE may continue to monitor whether at least one object, such as a user or other obstacle, enters at least one warning & monitoring region, similar to 1101. However, 1107 may be performed concurrently with 1101-05.

At 1109, at least one P-PBOR may be generated. In certain example embodiments, the UE may calculate the trajectory of the user, for example, by using at least one array of the UE as radar, and/or at least one specific beam. Furthermore, at least one future frame number may be associated with at least one predicted object location, which may be based upon its distance to an active array.

While a PHR reports the power headroom associated with the current frame and link quality in UL and DL, the P-PBOR discussed herein may separate and report the UL degradation due to the predicted user movement for the upcoming frames. This may enable optimal link recovery from the NE.

Additionally or alternatively, a required P-PBO may be estimated at a point of time associated with the at least one future frame number, as well as perform a duty cycle calculation. Finally, at least one vector may be generated, such as a P-PBOR vector, including the predicted P-PBO values associated with the at least one future frame numbers.

At 1111, at least one P-PBOR vector may be transmitted to the NE indicating at least one set of P-PBO values over a predetermined number of future frames. For example, the at least one P-PBOR may be transmitted to the at least one NE, which may be transmitted in at least one MAC container. The at least one P-PBOR may be configured similar to the vectors illustrated in FIG. 8. In some various example embodiments, the at least one P-PBOR may include one or more of at least one vector of P-PBO values, at least one vector of DC values, at least one vector of frame offsets, and at least one $P_{Cmax}$ for reference.

In various example embodiments, values contained in the at least one P-PBOR may be computed by estimating the trajectory of the user/object. Using the example in FIG. 9, the position of the user/object may be determined (by an active, inactive or both arrays) with respect to the active array based on the beam providing the detection. Such positioning may also be performed using delay calculations. The at least one P-PBOR may be generated based at least partially upon data from active and/or inactive arrays. At least one active array may be connected to at least one network entity, such as a gNB, while at least one inactive array may not be connected in a similar way but may instead monitor the at least one user/object and/or provide user/object trajectory data configured for generation of the at least one P-PBORs.

FIG. 10 describes several scenarios associated with the at least one P-PBOR. As summarized above, the at least one P-PBOR may be transmitted before the at least one MPE event occurs. The at least one warning indication notifies the NE of the worst-case scenario with the P-PBOR vector, which may indicate the actual predicted severity of the MPE event over time, in the form of subframes. As shown in Case 1, the user may approach the antenna triggering first the pre-warning region detection and then later the MPE trigger event. The user may enter the pre-warning region without triggering the MPE event, allowing the network to save an exhaustive list of alternative links for monitoring, conserve resources, and improve throughput, as presented in Case 2. And in Case 3, the MPE event may be predicted as being short and of medium severity, leaving the network to determine whether to balance the link rather than performing a handover procedure. This would leave the UE periodically monitoring the status of the user/obstacle, and transmitting an updated P-PBOR, as discussed above. In each of these three scenarios, the NE may be notified in advance of the severity of the MPE event, as well as a timeframe, allowing the NE to prepare for the failure and optimize associated resources in response.

In some example embodiments, the at least one P-PBOR vector set of P-PBO levels may include at least one indication of an actual severity of the at least one MPE event, as well as a period of time that the NE may adjust and/or redirect at least one alternative link.

At 1113, at least one alternative link may be received from the NE for testing, and at 1115, at least one received RSRP may be transmitted to the NE indicating at least one alternative link.

At 1117, the UE may continue to monitor whether at least one object, such as a user or other obstacle, enters at least one warning & monitoring region. Furthermore, at 1119, the at least one P-PBOR may be updated, which may be transmitted to the NE at 1121.

FIG. 12 illustrates an example of a flow diagram of a method that may be performed by a NE, such as NE 1320 illustrated in FIG. 13, according to certain example embodiments. At 1201, at least one warning indication may be received from at least one UE, such as 1310 in FIG. 13, indicating that at least one warning & monitoring region has been entered, the likelihood of at least one MPE event occurring, and/or at least one calculated worst-case P-PBO.

In some example embodiments, the at least one warning indication may depend on at least one reporting configuration and/or may be similar to a MAC CE element, such as a PHR structure described in 3GPP TS 38.321, section 6.1.3.8, as shown in FIG. 6. In general, a PHR reports any changes in path loss, including UL and DL. However, a PHR itself may not be practical for P-PBO reporting since UE power headroom is 100% regardless of transmission power requested by a NE, while transmission exposure may change drastically as the UE moves.

Furthermore, at least one bit of the MAC CE element may be reserved for indicating that the at least one warning indication includes at least one maxP-PBO. In various example embodiments, the at least one warning indication may include one or more of at least one C-RNTI, at least one value, such as the current maximum output power of UE 530 for carrier f of serving cell c ($P_{CMAX, f, c}$), configured as a reference, and/or at least one UL duty cycle (if applied). The at least one warning indication may include any combination of these features, where FIG. 7 illustrates several various combinations.

At 1203, at least one alternative link may be determined to be monitored upon at least one MPE event being triggered. In various example embodiments, the determination may be based on the at least one warning indication indicating that at least one warning region has been triggered and/or indication of a worst P-PBO received from the UE. As an example, the NE may further evaluate at least one neighboring cell load if it is determined that a handover procedure may be needed.

At 1205, at least one P-PBOR vector may be received from the at least one UE indicating at least one set of P-PBO values over a predetermined number of future frames. For example, the NE may receive at least one P-PBOR from the UE, which may be received in at least one MAC container. The at least one P-PBOR may be configured similar to the vectors illustrated in FIG. 8. In some various example embodiments, the at least one P-PBOR may include one or more of at least one vector of P-PBO values, at least one vector of DC values, at least one vector of frame offsets, and at least one $P_{Cmax}$ for reference.

In various example embodiments, values contained in the at least one P-PBOR may be derived by estimating the trajectory of the user/object. Using the example in FIG. 9, the values may be determined (by an inactive array) by the position of the user with respect to the active array based on the beam providing the detection. Such positioning may also be performed using delay calculations. The at least one P-PBOR may be generated based at least partially upon data from active and/or inactive arrays. At least one active array may be connected to at least one network entity, such as a gNB, while at least one inactive array may not be connected in a similar way but may instead monitor the at least one user/object and/or provide user/object trajectory data configured for generation of the at least one P-PBORs.

FIG. 10 describes several scenarios associated with the at least one P-PBOR. As summarized above, the NE may receive the at least one P-PBOR before the at least one MPE event occurs. The at least one warning indication notifies the NE of the worst-case scenario with the P-PBOR vector, which indicates the actual predicted severity of the MPE event over time, in the form of subframes. As shown in Case 1, the user may approach the antenna triggering first the pre-warning region detection and then later the MPE trigger event. The user may enter the pre-warning region without triggering the MPE event, allowing the network to save an exhaustive list of alternative links for monitoring, conserve resources, and improve throughput, as presented in Case 2. And in Case 3, the MPE event may be predicted as being short and of medium severity, leaving the network to determine whether to balance the link rather than performing a handover procedure. This would leave the UE periodically monitoring the status of the user/obstacle, and transmitting an updated P-PBOR, as discussed above. In each of these three scenarios, the NE may be notified in advance of the severity of the MPE event, as well as a timeframe, allowing the NE to prepare for the failure and optimize associated resources in response.

In some example embodiments, the at least one set of P-PBOs values may include at least one indication of an actual severity of the at least one MPE event, as well as a period of time that the NE may adjust and/or redirect at least one alternative link.

At 1207, at least one action may be performed based upon the at least one P-PBOR received from the UE. In some example embodiments, the NE may adapt its strategy to compensate for any imbalance between UL and DL. For example, if the severity of the MPE event indicated by the UE is below a predetermined threshold, the NE may determine a handover procedure should not be performed. Alternatively, if the severity of the MPE event indicated by the UE is equal to or above the predetermined threshold, the NE may determine to switch at least one UL transmission to a different frequency, such as FR1.

At 1209, based upon the at least one action in 1207, at least one message may be transmitted to the at least one UE configured to cause the UE to monitor at least one specific alternative link. At 1211, at least one received RSRP indicating at least one alternative link may be received from the UE. Furthermore, at 1213, at least one updated P-PBOR may be received from the at least one UE.

At 1215, at least one action may be performed based upon the at least one P-PBOR received from the UE. In some example embodiments, the NE may adapt its strategy to compensate for any imbalance between UL and DL. For example, if the severity of the MPE event indicated by the UE is below a predetermined threshold, the NE may determine that no handover procedure should be performed. Alternatively, if the severity of the MPE event indicated by the UE is equal to or above the predetermined threshold, the NE may determine to switch at least one UL transmission to a different frequency, such as FR1.

FIG. 13 illustrates an example of a system according to certain example embodiments. In one example embodiment, a system may include multiple devices, such as, for example, UE 1310 and NE 1320.

UE 1310 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

NE 1320 may be one or more of a base station, such as an evolved node B (eNB) or next generation node B (gNB), a next generation radio access network (NG RAN), a serving gateway, a server, and/or any other access node or combination thereof.

One or more of these devices may include at least one processor, respectively indicated as 1311 and 1321. At least one memory may be provided in one or more of devices indicated at 1312 and 1322. The memory may be fixed or removable. The memory may include computer program instructions or computer code contained therein. Processors 1311 and 1321 and memory 1312 and 1322 or a subset thereof, may be configured to provide means corresponding to the various blocks of FIGS. 6, 11, and 12. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 13, transceivers 1313 and 1323 may be provided, and one or more devices may also include at least one antenna, respectively illustrated as 1314 and 1324. The device may have many antennas, such as an array of antennas configured for multiple input multiple output (MIMO) communications, or multiple antennas for multiple radio access technologies. Other configurations of these devices, for example, may be provided.

Transceivers 1313 and 1323 may be a transmitter, a receiver, or both a transmitter and a receiver, or a unit or device that may be configured both for transmission and reception.

Processors 1311 and 1321 may be embodied by any computational or data processing device, such as a central processing unit (CPU), application specific integrated circuit (ASIC), or comparable device. The processors may be implemented as a single controller, or a plurality of controllers or processors.

Memory 1312 and 1322 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 6, 11, and 12). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 6, 11, and 12. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Figure 14:
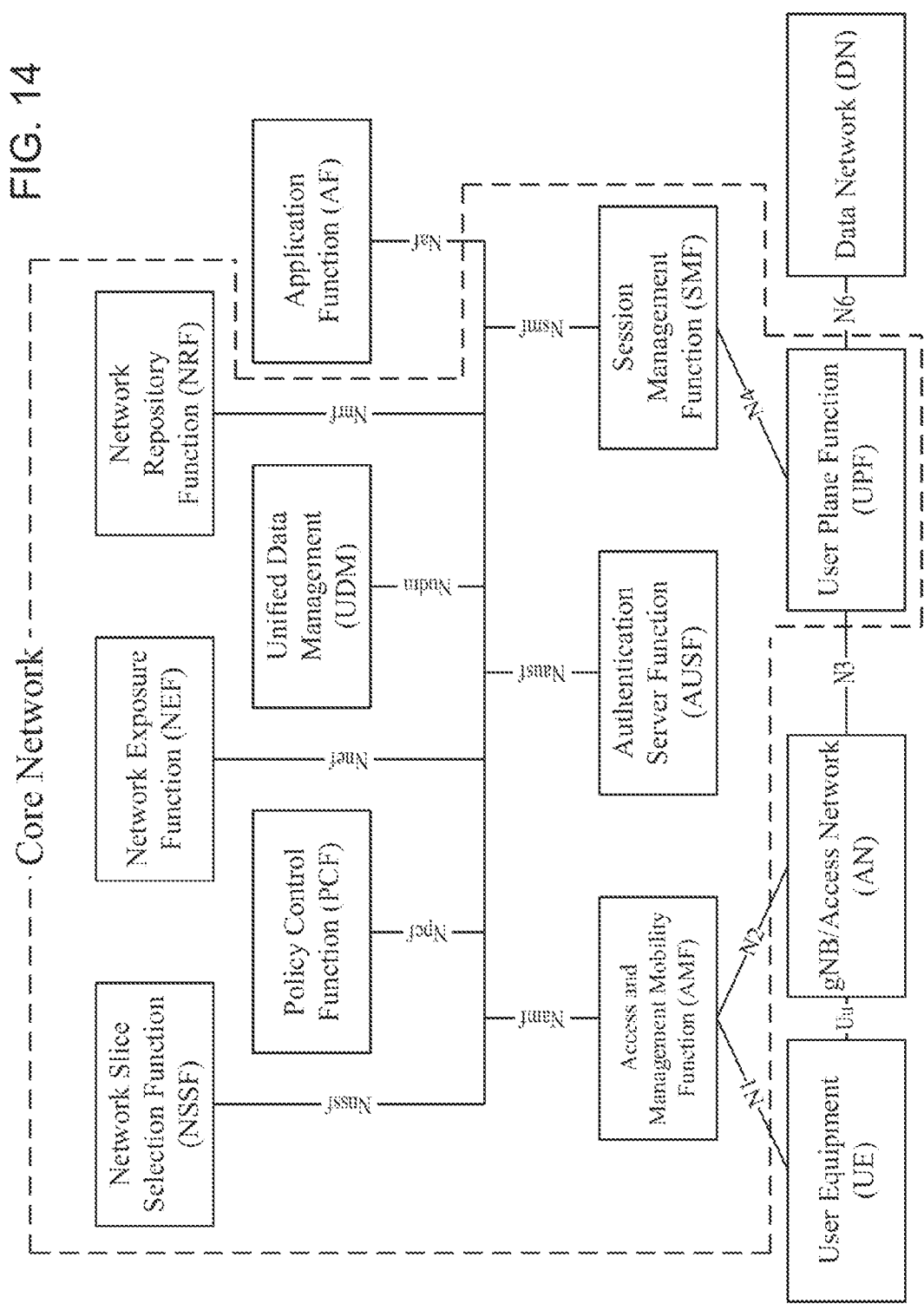
FIG. 14 illustrates an example of a 5G network and system architecture according to certain example embodiments.

FIG. 14 illustrates an example of a 5G network and system architecture according to certain example embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 1 may be similar to UE 610 and NE 620, respectively. The UPF may provide services such as intra-RAT and inter-RAT mobility, routing and forwarding of data packets, inspection of packets, user plane QoS processing, buffering of downlink packets, and/or triggering of downlink data notifications. The AF may primarily interface with the core network to facilitate application usage of traffic routing and interact with the policy framework.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an example embodiment may be included in at least one example embodiment. Thus, appearances of the phrases "in certain embodiments," "in some embodiments," "in other embodiments," or other similar language, throughout this specification do not necessarily all refer to the same group of example embodiments, and the described features, structures, or characteristics may be combined in any suitable manner in one or more example embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for selectively monitoring alternative links is not intended to limit the scope of certain example embodiments, but is instead representative of selected example embodiments.

One having ordinary skill in the art will readily understand that the example embodiments as discussed above may be practiced with procedures in a different order, and/or with hardware elements in configurations which are different than those which are disclosed. Therefore, although some example embodiments have been described based upon these example embodiments, it would be apparent to those of skill in the art that certain modifications, variations, and alternative constructions would be apparent, while remaining within the spirit and scope of example embodiments.

Partial Glossary

3GPP Third Generation Partnership Project
5G Fifth Generation
ASIC Application Specific Integrated Circuit
BOR Back Off Report
BS Base Station
CE Control Element
C-RNTI Cell Radio Network Temporary Identifier
CPU Central Processing Unit
DC Duty Cycle
DL Downlink
EIRP Equivalent Isotropically Radiated Power
eMBB Enhanced Mobile Broadband
eNB Evolved Node B
EPS Evolved Packet System
E-UTRAN Evolved Universal Mobile Telecommunications System Terrestrial Radio Access Network
FCC Federal Communications Commission
FR Frequency Range
GHz Gigahertz
gNB Next Generation Node B
GPS Global Positioning System
ICNIRP International Commission on Non-Ionizing Radiation Protection
HDD Hard Disk Drive
LOS Line of Sight
LTE Long-Term Evolution
MAC Medium Access Control
mmW Millimeter Wave
MEMS Micro Electrical Mechanical System
MIMO Multiple Input Multiple Output
MME Mobility Management Entity
mMTC massive Machine Type Communication
MPE Maximum Permissible Exposure
NAS Non-Access Stratum
NE Network Entity
NG Next Generation
NG-RAN Next Generation Radio Access Network
NR New Radio
NR-U New Radio Unlicensed
PA Power Amplification
P-PBO Predictive Power Back Off
P-PBOR Predictive Power Back Off Report
PC Power Class
$P_{cmax}$ User equipment maximum output power
PD Power Density
PDA Personal Digital Assistance
PHR Power Headroom Report
QoS Quality of Service RAM Random Access Memory
RAN Radio Access Network
RLF Radio Link Failure
RSRP Reference Signal Receive Power
TS Technical Specification
UE User Equipment
UL Uplink
UMTS Universal Mobile Telecommunications Service
URLLC Ultra-Reliable and Low-Latency Communication
UTRAN Universal Mobile Telecommunications Service Terrestrial Radio Access Network
WLAN Wireless Local Area Network

We claim:
1. An apparatus, comprising:
at least one processor; and
at least one memory including computer program code,
wherein the at least one memory and the computer program code are configured to, with the at least one processor, cause the apparatus to:
determine that at least one obstacle has entered at least one predefined region;
transmit to at least one network entity at least one indication comprising at least one predicted-power back off (P-PBO) value;
generate at least one predictive-PBO report (P-PBOR); and
transmit the at least one P-PBOR to the at least one network entity,
wherein the at least one P-PBOR is a maximum predicted PBO based upon speed of at least one user, trajectory of at least one user, speed of at least one object, and trajectory of at least one object, and is associated with at least one time stamp,
wherein the at least one time stamp comprises at least one frame number, at least one subframe number, at least one frame offset, at least one subframe offset, at least one slot number, at least one slot offset, and at least one subslot offset,
wherein the at least one P-PBOR is associated with at least one interval value that is based upon at least one PBO offset and at least one time offset, and is configured by the at least one network entity,
wherein the at least one P-PBOR is associated with at least one interval value configured by the apparatus based upon trajectory of at least one user, trajectory of at least one obstacle, speed of at least one user, and speed of at least one obstacle,
wherein the at least one P-PBOR is transmitted upon:
the one or more of at least one user and at least one obstacle crossing into the at least one predefined region, and
according to at least one threshold configured by the at least one network entity,
wherein the at least one P-PBOR is transmitted according to a periodicity associated according to:
at least one time-based threshold;
at least one fixed PBO threshold;
at least one variable PBO threshold;
at least one threshold configured by the at least one network entity;
at least one threshold configured by the apparatus; and
speed of the at least one user.

* * * * *